United States Patent
Rubino et al.

(10) Patent No.: US 11,251,480 B2
(45) Date of Patent: Feb. 15, 2022

(54) MINIATURE ELECTROCHEMICAL CELL HAVING A CASING OF A CONDUCTIVE PLATE CLOSING AN OPEN-ENDED CERAMIC CONTAINER HAVING TWO VIA HOLES SUPPORTING OPPOSITE POLARITY PLATINUM-CONTAINING CONDUCTIVE PATHWAYS

(71) Applicant: Greatbatch Ltd., Clarence, NY (US)

(72) Inventors: Robert S. Rubino, Williamsville, NY (US); David Dianetti, Lancaster, NY (US); Xiaohong Tang, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 127 days.

(21) Appl. No.: 16/655,286

(22) Filed: Oct. 17, 2019

(65) Prior Publication Data
US 2021/0119189 A1    Apr. 22, 2021

(51) Int. Cl.
| | |
|---|---|
| *H01M 50/10* | (2021.01) |
| *H01M 10/0525* | (2010.01) |
| *H01M 50/20* | (2021.01) |
| *H01M 50/116* | (2021.01) |
| *H01M 50/147* | (2021.01) |

(52) U.S. Cl.
CPC ....... *H01M 50/10* (2021.01); *H01M 10/0525* (2013.01); *H01M 50/116* (2021.01); *H01M 50/147* (2021.01); *H01M 50/20* (2021.01)

(58) Field of Classification Search
CPC .... H01M 50/10; H01M 50/20; H01M 50/116; H01M 50/147; H01M 10/052
See application file for complete search history.

(56) References Cited

U.S. PATENT DOCUMENTS

| | | | |
|---|---|---|---|
| 5,415,959 A | 5/1995 | Pyszczek et al. | |
| 8,603,667 B1 * | 12/2013 | Mano | H01G 11/74 |
| | | | 429/163 |
| 8,653,384 B2 | 2/2014 | Tang et al. | |
| 9,492,659 B2 | 11/2016 | Brendel et al. | |
| 10,249,415 B2 | 4/2019 | Seitz et al. | |

(Continued)

*Primary Examiner* — Maria Laios
*Assistant Examiner* — Bartholomew A Hornsby
(74) *Attorney, Agent, or Firm* — Michael F. Scalise

(57) ABSTRACT

A miniature electrochemical cell having a volume of less than 0.5 cc is described. The cell casing comprises an open-ended ceramic container having first and second via holes providing respective first and second electrically conductive pathways extending through the container. A metal lid secured to the open-end of the container by a gold seal provides the cell casing. An electrode assembly housed inside the casing comprises a cathode active material deposited on an inner surface of the ceramic container in contact with a current collector in electrical continuity with one of the conductive pathways. A solid electrolyte, preferably of LiPON ($Li_xPO_yN_z$), is deposited on the cathode active material followed by an anode active material in contact with the other conductive pathway. The first and second conductive pathways can comprise platinum or gold. That way, the first and second conductive pathways serve as negative and positive terminals for the cell. The negative and positive terminals are configured for electrical connection to a load.

26 Claims, 1 Drawing Sheet

(56) References Cited

U.S. PATENT DOCUMENTS

| | | | |
|---|---|---|---|
| 10,272,252 B2 | 4/2019 | Seitz et al. | |
| 10,350,421 B2 | 7/2019 | Stevenson et al. | |
| RE47,624 E | 10/2019 | Tang et al. | |
| 2008/0057390 A1* | 3/2008 | Kondo | H01M 10/28 |
| | | | 429/144 |
| 2009/0087739 A1* | 4/2009 | Takahashi | H01M 4/525 |
| | | | 429/188 |
| 2013/0032391 A1* | 2/2013 | Morioka | A61N 1/375 |
| | | | 174/650 |
| 2018/0108496 A1* | 4/2018 | Venkateswaran | H01M 50/183 |
| 2018/0226652 A1* | 8/2018 | Mori | H01M 4/668 |

* cited by examiner

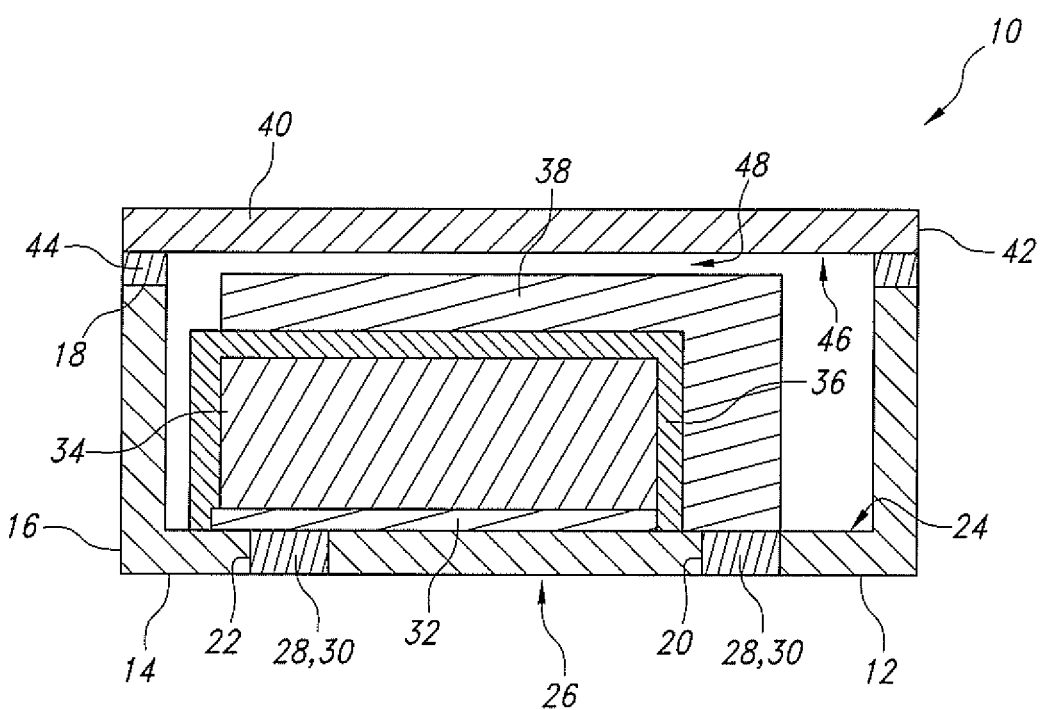

MINIATURE ELECTROCHEMICAL CELL HAVING A CASING OF A CONDUCTIVE PLATE CLOSING AN OPEN-ENDED CERAMIC CONTAINER HAVING TWO VIA HOLES SUPPORTING OPPOSITE POLARITY PLATINUM-CONTAINING CONDUCTIVE PATHWAYS

BACKGROUND OF THE INVENTION

1. Field of the Invention

This invention relates to the conversion of chemical energy to electrical energy. More particularly, the present invention relates to an electrochemical cell that preferably has a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry of an implantable medical device to power the medical device. In that respect, an electrochemical cell which is sufficiently hermetic to prevent ingress of moisture and egress of electrolyte so that it can operate for ten years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

Thin film batteries are a convenient approach for the assembly of small cells. Electroactive layers are deposited, typically by physical vapor deposition, onto a substrate with an intermediary layer of solid electrolyte that also functions as a separator to electrically isolate the anode and cathode and their terminals from each other. The substrate must be able to withstand high temperatures during layer deposition and during any required annealing of the deposited layers. Typically, ceramics are used as substrates with a non-porous lid attached using a polymeric adhesive layer that also serves as the feedthrough seal for the opposite polarity terminals. The problem is that the polymeric adhesive layer cannot consistently and adequately prevent egress or ingress of atmospheric contaminants that can disrupt charging and discharging of the cell. For example, ingress of water is particularly problematic for lithium cells. Thus, polymeric seals may not provide the consistent longevity required for some applications.

Moreover, as electrochemical cells become smaller and smaller, it becomes more difficult to find space for a port for filling electrolyte into their casings. As the fill port becomes smaller, it becomes increasingly more difficult to find a practical means of plugging and hermetically sealing the fill port. For electrochemical cells that have a total volume or size that is less than 0.5 cc, it becomes advantageous to use a solid electrolyte so that no filling is required.

However, since secondary electrochemical cells activated with a solid electrolyte typically undergo expansion and contraction during charging and discharging, they require hermetic casings that suitably accommodate this cycling induced dimensional change. Those types of hermetic casings for miniature electrochemical cells do not currently exist.

For that reason, the present invention provides a casing construction that is suitable for use with hermetically sealed solid-state secondary or re-chargeable electrochemical cells and that has sufficient dimensional flexibility to accommodate the expected dimensional changes during cycling. While useful with cells of virtually any size, the present hermetic casing is particularly well suited for cells having a total volume or size that is less than 0.5 cc.

SUMMARY OF THE INVENTION

The present invention describes an electrochemical cell construction which is readily adapted to miniature cell designs. However, while the present casing is adapted for miniature electrochemical systems, the casing design is also applicable to cells that are not classified as "miniature". A miniature electrochemical cell is defined as one having a total volume that is less than 0.5 cc.

With cell sizes below 0.5 cc, it may become advantageous to use a solid electrolyte so that filling the casing with a liquid is not required. However, conventional solid electrolyte cells are known to undergo expansion and contraction during cycling and consequently require hermetic casing structures that are designed to accommodate the expected dimensional changes. Hermetic enclosure designs for miniature cells activated with solid electrolyte systems do not currently exist. Therefore, one aspect of the present invention is to provide a hermetic casing structure for a miniature solid-state electrochemical cell that will accommodate the required dimensional changes during cycling.

Another problem with conventional miniature electrochemical cell designs is the need for the materials from which the cell is constructed to be both chemically compatible with each other and not susceptible to undesirable corrosion reactions. A miniature electrochemical cell according to the present invention uses an electrically conductive metal-containing paste that is filled into two opposite polarity via holes extending through a cup-shaped, open-ended ceramic container. The via holes are formed (drilling, punching, cutting, machining, and waterjet cutting) with the ceramic container being in a green state. The open-ended ceramic container is then sintered to transform the metal-containing pastes into solid electrically conductive pathways extending through the sintered ceramic container. When cell construction is completed, the pathways will provide a negative-polarity pathway and a positive-polarity pathway.

Next, a cathode current collector is deposited on an inner surface of the ceramic container in contact with the positive-polarity electrically conductive pathway. In addition to providing electrical conduction from the to-be-deposited cathode active layer to the electrically conductive material residing in the via hole, the cathode current collector protects the metallic electrically conductive material in the via hole from corrosive reactions with other battery components while exhibiting good adhesion to the ceramic container or to an adhesion layer, for example an adhesion layer of titanium, on the inner surface of the ceramic container should there be one. An exemplary cathode current collector according to the present invention is from about 0.1 microns to about 50 microns thick and comprised of a metallic layer that is deposited on the inner surface of the open-ended ceramic container using a physical vapor deposition (PVD) process, for example sputtering deposition or evaporation deposition, so that the deposited metal covers the via hole. Exemplary current collector materials include nickel, titanium, copper, and Ti/NiV composites.

A cathode active material is deposited on the cathode current collector opposite the positive-polarity electrically conductive pathway using a physical vapor deposition process. That way, the cathode active material is in electrical continuity with the positive-polarity pathway through the cathode current collector.

A solid electrolyte, such as an electrolyte of LiPON ($Li_xPO_yN_z$), is supported on the cathode active material opposite the cathode current collector. The solid electrolyte, which also serves as a separator, contacts the inner surface of the ceramic container between the positive- and negative-polarity pathways to thereby essentially encase the cathode active material and its current collector.

An anode active material is deposited on the solid electrolyte opposite the cathode active material. The anode active material is deposited using a physical vapor deposition process or evaporation process and has a shape that extends along the solid electrolyte/separator to contact the negative-polarity pathway extending through the ceramic container.

An intermediate ring-shaped gold pre-form resides between an electrically conductive lid and the upper edge of an annular sidewall comprising the ceramic container. Preferably, the upper annular edge of the container is metallized. Then, an ultra-sonic welding process or a laser welding process is used to melt and seal the gold to the metal lid and to the ceramic container, thereby closing the open end of the container. An important aspect of the present miniature electrochemical cell is that the anode active material does not contact an inner surface of the metal lid. The gap between the lid and the anode active material provides a casing construction that accommodates the cycling induced dimensional expansion and contraction that secondary electrochemical cells activated with a solid electrolyte typically undergo during charging and discharging.

Thus, the present invention describes a miniature electrochemical cell activated with a solid electrolyte. The cathode or positive terminal is comprised of a metal-containing material residing in and hermetically bonded or sealed to a cathode or positive-polarity via hole extending through the cup-shaped ceramic container. Likewise, the anode or negative terminal is comprised of a metal-containing material residing in and hermetically bonded or sealed to an anode or negative-polarity via hole extending through the ceramic container. The hermetic bonds are formed by co-firing metal-containing pastes filled into the negative- and positive-polarity via holes extending through a green ceramic body comprising the ceramic container. The metal-containing materials are preferably substantially pure platinum, or a platinum/ceramic composite and the open-ended ceramic container is comprised of 3% YSZ or alumina. Cathode and anode active materials prevented from direct physical contact with each other by a separator are provided by PVD deposition to be in electrical continuity with their respective positive- and negative-polarity pathways. A current collector preferably resides between the positive-polarity pathway and the cathode active material. The metal lid is sized and shaped (configured) to close the open end of the ceramic container to thereby provide the casing housing the electrode assembly comprising the cathode and anode active materials.

Alternatively, the metal-containing material in the negative- and positive-polarity via holes is gold. After sintering and after the positive- and negative-polarity via holes are metallized with titanium or titanium and niobium to facilitate gold wetting, gold pre-forms are positioned in the via holes. The ceramic container is then heated to melt the gold and bond it to the walls of the metallized via holes.

Moreover, the present electrochemical cell is not limited to any one chemistry and can be of a primary lithium cell, a rechargeable lithium cell, a thin film solid-state cell, and the like. Preferably, the cell is a lithium-ion electrochemical cell comprising a lithium anode and a lithiated metal oxide-based cathode, such as of $LiCoO_2$ or lithium nickel manganese cobalt oxide ($LiNi_aMn_bCo_{1-a-b}O_2$). The present invention is also useful with a solid-state thin film electrochemical cell having a lithium anode, a metal-oxide based cathode and a solid electrolyte, such as an electrolyte of LiPON ($Li_xPO_yN_z$).

These and other aspects of the present invention will become increasingly more apparent to those of ordinary skill in the art by reference to the following description and the appended drawings.

BRIEF DESCRIPTION OF THE DRAWING

FIG. 1 is a cross-sectional view of one embodiment of a miniature electrochemical cell 10 according to the present invention.

DETAILED DESCRIPTION OF THE PREFERRED EMBODIMENTS

A miniature cell according to the present invention is not limited to any one electrochemical system or chemistry. The miniature electrochemical cell can be a primary lithium cell, a rechargeable lithium cell, a thin film solid-state cell, and the like. An exemplary miniature electrochemical cell is of a lithium-ion chemistry having a lithium anode and a metal oxide-based cathode, such as a cathode of $LiCoO_2$ or $LiNi_aMn_bCo_{1-a-b}O_2$ activated with a solid electrolyte, or the cell is of a solid-state chemistry having a lithium anode, a metal-oxide based cathode and a solid electrolyte. An exemplary solid electrolyte is LiPON ($Li_xPO_yN_z$, with x ranging from 3 to 4, y ranging from 3 to 4 and z ranging from 0.1 to 1)).

Referring now to the drawing, FIG. 1 illustrates an exemplary embodiment of a miniature electrochemical cell 10 according to the present invention. The cell 10 has a casing comprising an open-ended container 12 of an electrically insulative ceramic material. The container 12 comprises a base 14 supporting an outwardly extending annular sidewall 16. The sidewall 16 extends to an annular edge 18 spaced from the base 14. Preferably the sidewall 16 meets the base 14 at a right angle.

The ceramic container 12 is comprised of 3% YSZ or essentially high purity alumina ceramic of the chemical formula $Al_2O_3$. "Essentially pure" means that the post-sintered ceramic is at least 96% alumina up to 99.999% alumina. In various embodiments, the post-sintered ceramic container 12 is at least 90% alumina, preferably at least 92% alumina, more preferably at least 94% alumina, and still more preferably at least 96% alumina.

The design of the container 12 is not limited to any one shape. As those skilled in the art will readily recognize, a myriad of different shapes is contemplated for the open-ended container 12, the specific shape being limited only by the form factor for the application or device that the cell 10 is intended to power. In that respect, a cross-section of the annular sidewall 16 has the same shape as the periphery of the base 14.

The base 14 of the electrically insulative ceramic container 12 is provided with a first via hole 20 and a second via hole 22, both via holes extending to a base inner surface 24 and a base outer surface 26. The via holes 20, 22 are preferably formed by drilling, punching, cutting, machining, and waterjet cutting through the ceramic.

A platinum-containing material, for example a substantially closed pore, fritless and substantially pure platinum material 28, fills the via holes 20, 22 to thereby form electrically conductive pathways extending between and to the inner and outer surfaces 24, 26 of the ceramic base 14 of the open-ended container 12. The platinum-containing material 28 is hermetically sealed to the ceramic base 14 and has a leak rate that is not greater than $1 \times 10^{-7}$ std. cc He/sec.

According to another embodiment of the present invention, in lieu of the substantially pure platinum material 28, the via holes 20, 22 are filled with a composite reinforced metal ceramic (CRMC) material 30. The CRMC material 30 is a platinum-containing material that comprises, by weight %, from about 10:90 ceramic:platinum to about 90:10 ceramic:platinum or, from about 70:30 ceramic:platinum to about 30:70 ceramic:platinum.

Examples of suitable CRMC materials 30 include, but are not limited to:
a) Alumina ($Al_2O_3$) or zirconia ($ZrO_2$) including various stabilized or partially stabilized zirconia like zirconia toughened alumina (ZTA) and alumina toughened zirconia (ATZ) with platinum (Pt) or palladium (Pd); and
b) Alumina ($Al_2O_3$) or zirconia ($ZrO_2$) with iridium, rhenium, rhodium, various Pt alloys (e.g., Pt—Ir, Pt—Pd, Pt—Rh, Pt—Re, Pt—Au, Pt—Ag etc.), Pd alloys (e.g., Pd—Ir, Pd—Re, Pd—Rh, Pd—Ag, Pd—Au, Pd—Pt, Pd—Nb, etc.), Au alloys (e.g., Au—Nb, Au—Ti, etc.), Au alloys (e.g., Au—Nb, Au—Ti, etc.), and Ti alloys (e.g., Ti—Al—V, Ti—Pt, Ti—Nb, etc.).

Other non-limiting biocompatible metals and alloys that may be used in place of platinum include niobium, platinum/palladium, stainless steels, and titanium.

Furthermore, any of the following materials may be used alone or in combination with any of the materials already discussed or within this list: gold (Au), silver (Ag), iridium (Ir), rhenium (Re), rhodium (Rh), titanium (Ti), tantalum (Ta), tungsten (W), zirconium (Zr), and vanadium (V); cobalt chromium molybdenum alloy, cobalt chromium nickel iron molybdenum manganese alloy, cobalt chromium tungsten nickel iron manganese alloy, cobalt nickel chromium iron molybdenum titanium alloy, cobalt nickel chromium iron molybdenum tungsten titanium alloy, cobalt nickel chromium molybdenum alloy, copper aluminum nickel alloy, copper zinc alloy, copper zinc aluminum nickel alloy, copper zinc silver alloy, gold platinum palladium silver indium alloy, iron chromium alloy, iron chromium nickel alloy, iron chromium nickel aluminum alloy, iron chromium nickel copper alloy, iron chromium nickel copper molybdenum niobium alloy, iron chromium nickel copper niobium alloy, iron chromium nickel copper titanium niobium alloy, iron chromium nickel manganese molybdenum alloy, iron chromium nickel molybdenum alloy, iron chromium nickel molybdenum aluminum alloy, iron chromium nickel titanium molybdenum alloy, iron manganese chromium molybdenum nitrogen alloy, nickel platinum alloy, nitinol, nickel titanium alloy, nickel titanium aluminum alloy, niobium-titanium alloy, platinum iridium alloy, platinum palladium gold alloy, titanium aluminum vanadium alloy, titanium based aluminum iron alloy, titanium based aluminum molybdenum zirconium alloy, titanium based molybdenum niobium alloy, titanium based molybdenum zirconium iron alloy, titanium based niobium zirconium alloy, titanium based niobium zirconium tantalum alloy, titanium molybdenum alloy, titanium niobium alloy, titanium platinum alloy, and titanium-based molybdenum zirconium tin alloy.

The interfacial boundary between the ceramic base 14 and the substantially pure platinum-containing material 28 or CRMC material 30 forms a meandering or undulating path of sufficient tortuousity so that the boundary inhibits crack initiation, and more importantly, crack propagation, and additionally, because of the intimacy of the interface, impairs leakage of fluids. As used herein, the word tortuous or tortuousity refers to the roughened, complex, or undulating interface that is formed at the boundary between the ceramic base 14 and the substantially pure platinum-containing material 28 or the CRMC material 30. This tortuous interface is characterized by hills and valleys which are topographically three dimensional and form very strong and reliable hermetic bonds.

In an exemplary embodiment of the present invention, a method of manufacturing the open-ended container 12 comprising the electrically conductive pathways 28 or 30 in the via holes 20 and 22 includes forming the base 14 supporting the outwardly extending annular sidewall 16 having the desired form factor, the container 12 being in a green state comprising at least 96% alumina; forming the via holes 20 and 22 extending through the ceramic base 14; filling the via holes 20 and 22 with an electrically conductive paste (not shown), the electrically conductive paste comprising a mixture of a substantially pure platinum powder, an inactive organic binder, and possibly a solvent and/or plasticizer, or a CRMC powder and an inactive organic binder, solvent and/or plasticizer; placing the green-state ceramic container 12 and conductive paste filled via holes 20 and 22 into an air filled heating chamber and heating the assembly to form a sintered monolithic structure. It is believed that the substantially pure platinum-containing material 28 forms an interface with the ceramic container comprising a glass that is at least about 60% silica.

It is understood that throughout this disclosure when substantially pure platinum and CRMC pastes are referred to, those pastes include solvents and binders that are baked out during sintering. Suitable binders are selected from the group consisting of ethyl cellulose, acrylic resin, polyvinyl alcohol, polyvinyl butyral and a poly(alkylene carbonate) having the general formula R—O—C(=O)—O with R=$C_1$ to $C_5$. Poly(ethylene carbonate) or polypropylene carbonate) are preferred poly(alkylene carbonates). Suitable solvents are selected from the group consisting of terpineol, butyl carbitol, cyclohexanone, n-octyl alcohol, ethylene glycol, glycerol, water, and mixtures thereof.

In another exemplary embodiment, forming the ceramic container 12 comprises laminating a plurality of ceramic green sheets together to thereby provide the desired form factor, followed by sintering.

In greater detail, to achieve sustainable hermeticity between the platinum-containing material 20 and the ceramic base 14, the following is required. Because the coefficient of thermal expansion (CTE) of platinum is sufficiently higher than the CTE of alumina, it is not theoretically possible for alumina to provide compressive forces on a solid platinum body, for example a solid platinum wire, residing in a via hole extending through the alumina. To overcome the CTE differences between these two materials, a platinum body residing in an alumina via hole must be formed using a platinum paste having a minimum of 80% platinum solids loading. The term "paste" is defined as a smooth, soft mass having a pliable consistency and comprising pure platinum particles, a binder material and a solvent. In a preferred embodiment, the solids loading of platinum particles in the paste is about 90%. In a more preferred embodiment, the solids loading of platinum particles in the paste is about 95%.

In addition, the via holes 20 and 22 must be packed so that the platinum-containing paste occupies at least about 90% of their available space. In a preferred embodiment, the platinum-containing paste occupies about 95% of the via hole space. In a more preferred embodiment, the platinum-containing paste occupies about 99% of the via holes 20 and 22.

The shrinkage of the alumina must not be greater than about 20% of that of the volume of the platinum-containing paste in the via holes 20, 22. In a preferred embodiment, shrinkage of the alumina is about 14% of the volume of the platinum-containing paste in the via holes 20, 22. In a more preferred embodiment, shrinkage of the alumina is about 16% of the volume of the platinum-containing paste in the via holes 20, 22.

After the platinum-containing paste is filled into the via holes 20 and 22 extending through the ceramic base 14, the open-ended ceramic container 12 is exposed to a controlled co-firing heating profile in ambient air that comprises a binder bake-out portion, a sinter portion, and a cool down portion.

In one embodiment, the binder bake-out portion of the controlled co-firing heating profile is performed at a temperature of from about 400° C. to about 700° C. for a minimum of about 4 hours. A preferred binder bake-out protocol is performed at a temperature of from about 550° C. to about 650° C. A more preferred binder bake-out is performed at a temperature of from about 500° C. to about 600° C.

Next, the sintering portion of the controlled co-firing heating profile is preferably performed at a temperature ranging from about 1,400° C. to about 1,900° C. for up to about 6 hours. A preferred sintering profile is at a temperature from about 1,500° C. to about 1,800° C. A more preferred sintering temperature is from about 1,600° C. to about 1,700° C.

Then, the cool down portion of the controlled co-firing heating profile occurs either by turning off the heating chamber and allowing the chamber to equalize to room temperature or, preferably by setting the cool down portion at a rate of up to about 5° C./min from the hold temperature cooled down to about 1,000° C. At about 1,000° C., the chamber naturally equalizes to room temperature. A more preferred cool down is at a rate of about 1° C./min from the hold temperature to about 1,000° C. and then allowing the heating chamber to naturally equalize to room temperature. In so doing, a robust hermetic seal is achieved between the mating materials of the ceramic container 12 and the platinum-containing material 28 in the via holes 20 and 22.

During processing, compression is imparted by the ceramic base 14 around the platinum-containing paste in the via holes 20 and 22 due to volume shrinkage of the alumina being greater than that of the paste. Furthermore, the platinum is sufficiently malleable at this phase to favorably deform by the compressive forces applied by the ceramic base 14. The combination of the platinum solids loading in the paste, the platinum packing in the via holes 20 and 22 and the shrinkage of the ceramic base 14 being greater than that of the platinum-containing paste as the paste is solidified to a solid platinum-containing material results in the platinum taking the shape of the mating alumina surface.

The amount of platinum solids loading, its packing percentage in the via holes 20 and 22 and the malleability of the platinum material all contribute to formation of a hermetic seal between the platinum-containing material 28 and the ceramic base 14. In addition, the compressive forces that result from the greater volumetric shrinkage of the ceramic base 14 than that of the platinum-containing material 28 in the via holes 20 and 22 limit expansion of the platinum and force the platinum to deform to the contour of the surface of the via holes 20, 22 to consequently form a hermetic seal. Thus, an interface between the ceramic base 14 and the platinum-containing material 28 that conforms to the respective interface surfaces and results in a nearly exact mirror image of the interfacing surfaces is formed, thereby creating a hermetic bond therebetween.

Analysis of the interface between the ceramic base 14 and the platinum-containing material 26 of this invention showed not only the creation of an intimate interface, but, in the case of the interfacial layer, a hermetic structure that exhibits an amorphous layer at the interface comprising the elements platinum, aluminum, carbon and oxygen that appear to impart resistance to erosion by body fluids. Both these bonding mechanisms, direct bonding and an amorphous interfacial layer, offer additional tolerance to the CTE mismatch between the ceramic base 14 and the platinum-containing material 26.

On the other hand, CRMC very closely matches the CTE of the alumina. This results in a very good hermetic seal between the CRMC and the ceramic container 12. Under certain processing conditions cermets may form a thin glass layer or even an alumina layer over the via ends. In that case, it may be necessary to perform an additional manufacturing step, such as acid etch, lapping or mechanical abrasion, to remove this formed layer.

While the above description regarding the controlled co-firing heating profile has been presented with respect to an alumina ceramic, it is believed that 3% YSZ ceramic will function in a similar manner.

For additional information regarding via holes filled with electrically conductive materials, reference is made to U.S. Pat. No. 8,653,384 to Tang et al., U.S. Pat. No. 9,492,659 to Tang et al., U.S. Pat. No. 10,249,415 to Seitz et al. and RE47,624 to Tang et al. (which is a re-issue of the '384 patent). These patents are assigned to the assignee of the present invention and incorporated herein by reference. For additional information regarding via holes filled with a CRMC material, reference is made to U.S. Pat. No. 10,350,421 to Seitz et al. and U.S. Pat. No. 10,272,252 to Seitz et al. These patents are assigned to the assignee of the present invention and incorporated herein by reference.

Alternatively, the metal-containing material in the via holes 20, 22 is gold. After sintering the green-state ceramic container and after the via holes 20, 22 are metallized with titanium or titanium and niobium to facilitate gold wetting, a gold pre-form is positioned in the via holes 20, 22. The ceramic container 12 is then heated to melt the gold and bond it to the walls of the metallized via holes.

After the open-ended ceramic container 12 with the platinum-containing material 28 or 20 or gold residing in the via holes 20, 22 is made, a thin-film cathode current collector 32 is contacted to the inner surface 24 of the ceramic base 14 using physical vapor deposition (PVD). The cathode current collector 32 is preferably a continuous layer of titanium that is devoid of perforations and is in electrical continuity with the electrically conductive material 28, 30 or gold residing in the via hole 22. In that manner, the via hole 22 serves as a positive-polarity pathway. The titanium current collector 32 has a thickness measured outwardly from the inner surface 24 of the ceramic base 14 that ranges from about 0.1 µm to about 3 µm. Nickel, stainless steel, tantalum, platinum, gold, aluminum, cobalt, molybdenum, a Ti/NiV composite, and alloys thereof are also suitable materials for the cathode current collector 32.

A layer of cathode active material 34 is supported on the cathode current collector 32. Preferably the cathode active material 34 is deposited using a physical vapor deposition process and has a thickness that ranges from about 25 µm to about 5,000 µm. Suitable cathode active materials are lithiated metal oxide-based materials, for example $LiCoO_2$, $LiMnO_2$, $LiMn_2O_4$, $LiFePO_4$, $Ag_2V_4O_{11}$, $V_2O_5$ and lithium nickel manganese cobalt oxide ($LiNi_aMn_bCo_{1-a-b}O_2$).

A solid electrolyte 36 ($Li_xPO_yN_z$) layer contacts the cathode active material 34, opposite the cathode current collector 32. The solid electrolyte 36, which also serves as a separator, is shaped to contact the inner surface 24 of the ceramic container, thereby essentially encasing the cathode active material 34 and its current collector 32. The solid electrolyte 36 contacts the ceramic container 12 between the via holes 20 and 22 and has a thickness that ranges from about 1 µm to about 5 µm.

A layer of anode active material 38 contacts the solid electrolyte 36 opposite the cathode active material 34. The anode active material 38 extends along the solid electrolyte layer 36 to contact the electrically conductive material 28, 30 or gold residing in the via hole 20. Preferably the anode active material 38 is deposited using a physical vapor deposition process to a thickness that ranges from about 25 µm to about 4,000 µm. Suitable anode active materials include lithium and its alloys and intermetallic compounds including, for example, Li—Si, Li—Sn, Li—Al, Li—B and Li—Si—B alloys, and mixtures and oxides thereof. It is noted that for the anode active material 38, an anode current collector is not needed. In other words, there is acceptable electrical continuity with the anode active material 38 directly contacting the electrically conductive material 28, 30 or gold residing in the via hole 20.

In that manner, the via hole 20 serves as a negative-polarity pathway with the solid electrolyte 36 physically segregating the anode active material 38 from the cathode active material 34/cathode current collector 32 and the positive-polarity pathway in via hole 22. Consequently, the negative- and positive-polarity pathways 20, 22 are configured for electrical connection to a load.

An exemplary chemistry for the miniature electrochemical cell 10 shown in FIG. 1 has lithium as an anode active material 38, $LiCoO_2$ as a cathode active material 34 and the solid electrolyte/separator 36 is of LiPON ($Li_xPO_yN_z$, with x ranging from 3 to 4, y ranging from 3 to 4 and z ranging from 0.1 to 1). An exemplary electrode assembly is the $Li/LiCoO_2$ couple.

In the exemplary secondary electrochemical cell 10, in addition to lithium, the anode active materials 38 can comprise a material capable of intercalating and de-intercalating or alloying with an alkali metal, preferably lithium. The cathode active material 34 of the exemplary secondary electrochemical cell 10 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

The open end of the ceramic container 12 is closed with an electrically conductive metal cover plate or lid 40, for example, a titanium lid. The lid 40 is sized and shaped so that its outer annular edge 42 is substantially aligned with the outer surface of the container sidewall 16.

An intermediate ring-shaped pre-form of gold 44 resides between the lid 40 and the upper edge 18 of the container sidewall 16. Preferably, the upper annular edge 18 is first metallized with an adhesion layer followed by a wetting layer disposed on the adhesion layer. The adhesion layer is titanium and the wetting layer comprises molybdenum or niobium. Alternatively, gold can be deposited onto the wetting layer by physical vapor deposition.

Then, an ultra-sonic weld or laser weld is used to melt and seal the gold 44 to the metal lid 40 and the container sidewall 16, thereby closing the open end of the container. In particular, gold 44 contacts and seals between the annular edge 18 of the ceramic container sidewall 16 and an inner surface 46 of the lid 40 proximate the lid outer annular edge 42. The gold seal 44 between the lid 40 and the wetting metallization contacting the adhesion metallization contacting the ceramic sidewall 16 has a leak rate that is not greater than $1 \times 10^{-7}$ std. cc He/sec.

With the metal lid 40 sealed to the open end of the ceramic container 12, it is noted that a very small gap 48 exists between the inner surface 46 of the lid 40 and an upper surface of the anode active material 38. Since secondary electrochemical cells typically undergo expansion and contraction during charging and discharging, they require hermetic casings that suitably accommodate this cycling induced dimensional change. Gap 48 accommodates this expansion. Moreover, should the anode active material 38 contact the lid 40, the metal lid is sufficiently flexible to accommodate the expected dimensional changes during cycling of the secondary electrochemical cell 10.

In addition to titanium, suitable materials for the lid 40 include stainless steel, mild steel, nickel-plated mild steel, but not limited thereto, so long as the metallic material is compatible for use with the other cell components.

Thus, the base 14 of the open-ended ceramic container 12 for the electrochemical cell 10 of the present invention preferably has a diameter that is less 1 cm and the outwardly extending sidewall 16 has a height that is less than 1 mm. More preferably, total volume for the cell casing comprising the lid 40 sealed to the open end of the container 12 is less than 0.5 cc. Constructing the casing from an open-ended ceramic container 12 closed by a metal lid 40 enables the miniature electrochemical cell 10 of the present invention.

Now, it is therefore apparent that in an exemplary embodiment the present invention relates to a miniature electrochemical cell 10 having a total volume of less than 0.5 cc. Moreover, while embodiments of the present invention have been described in detail, such is for illustration, not limitation.

What is claimed is:
1. An electrochemical cell, comprising:
 a) a casing, comprising:
  i) an open-ended ceramic container having a first via hole and a second via hole, both via holes extending to a ceramic container inner surface and a spaced apart ceramic container outer surface;
  ii) a first electrically conductive pathway sealed to the ceramic container in the first via hole and a second electrically conductive pathway sealed to the ceramic container in the second via hole; and
  iii) a metal lid hermetically closing the open-ended ceramic container; and b) an electrode assembly housed in the casing, the electrode assembly comprising:
  i) current collector contacted to the ceramic container inner surface and being in an electrically conductive relationship with the first electrically conductive pathway;
  ii) a first electroactive material contacting the current collector opposite the first electrically conductive pathway extending through the first via hole;
  iii) an opposite polarity second electroactive material contacting the ceramic container inner surface spaced from the first electroactive material and the current collector, the second electroactive material being in an electrically conductive relationship with the second electrically conductive pathway extending through the second via hole in the ceramic container; and
  iv) a solid electrolyte contacting the inner surface of the ceramic container between and separating the first and second electroactive materials from direct physical contact with each other,
c) wherein the first electrically conductive pathway serves as a first terminal, and the second electrically pathway serves as an opposite polarity second terminal, and wherein the first and second terminals are configured for electrical connection to a load.

2. The electrochemical cell of claim 1, wherein the ceramic container is selected from alumina and 3% YSZ.

3. The electrochemical cell of claim 1, wherein the open-ended ceramic container comprises a ceramic base supporting an outwardly extending annular ceramic sidewall having an outer annular edge, and wherein the lid is hermetically secured to the outer annular edge by a gold seal to thereby close the ceramic container.

4. The electrochemical cell of claim 1, wherein at least one of the first and second electrically conductive pathways comprises gold.

5. The electrochemical cell of claim 1, wherein at least one of the first and second electrically conductive pathways comprises a platinum-containing material.

6. The electrochemical cell of claim 5, wherein the platinum-containing material is selected from a substantially pure platinum material and a composite reinforced metal ceramic (CRMC) material, the CRMC material comprising, by weight %, from about 10:90 ceramic:platinum to about 90:10 ceramic:platinum.

7. The electrochemical cell of claim 6, wherein the CRMC material comprises from about 70:30 ceramic:platinum to about 30:70 ceramic:platinum.

8. The electrochemical cell of claim 6, wherein the ceramic in the CRMC material is either 3% YSZ or alumina.

9. The electrochemical cell of claim 1, wherein the solid electrolyte encases the first electroactive material and the current collector.

10. The electrochemical cell of claim 1, wherein the electrode assembly is of either a Li/LiCoO$_2$ or a Li/LiNi$_a$Mn$_b$Co$_{1-a-b}$O$_2$ couple.

11. The electrochemical cell of claim 1, wherein the solid electrolyte is Li$_x$PO$_y$N$_z$ with x ranging from 3 to 4, y ranging from 3 to 4, and z ranging from 0.1 to 1.

12. The electrochemical cell of claim 1, wherein the lid is selected from the group of titanium, stainless steel, mild steel, and nickel-plated mild steel.

13. An electrochemical cell, comprising:
a) a casing, comprising:
  i) an open-ended ceramic container comprising a ceramic base supporting an outwardly extending annular ceramic sidewall having an outer annular edge, the ceramic container having a ceramic container inner surface spaced from a ceramic container outer surface;
  ii) a first via hole and a second via hole, both via holes extending through the ceramic container from the inner surface to the ceramic container outer surface;
  iii) a first electrically conductive pathway sealed to the ceramic container in the first via hole and a second electrically conductive pathway sealed to the ceramic container in the second via hole; and
  iv) a metal lid hermetically secured to the outer annular edge of the ceramic sidewall by a gold seal to thereby close the open-ended ceramic container; and
b) an electrode assembly housed in the casing, the electrode assembly comprising:
  i) a cathode current collector supported on the ceramic container inner surface, the cathode current collector being electrically connected to the first electrically conductive pathway residing in the first via hole;
  ii) a cathode active material contacting the cathode current collector opposite the first electrically conductive pathway;
  iii) an anode active material contacting the ceramic container inner surface spaced from the cathode active material and the current collector, the anode active material being in an electrically conductive relationship with the second electrically conductive pathway residing in the second via hole; and
  iv) a solid electrolyte contacting the inner surface of the ceramic container between and separating the anode and cathode active materials from direct physical contact with each other,
c) wherein the first electrically conductive pathway serves as a negative terminal, and the second electrically pathway serves as an opposite polarity positive terminal, and wherein the negative and positive terminals are configured for electrical connection to a load.

14. The electrochemical cell of claim 13, wherein the ceramic container is selected from alumina and 3% YSZ.

15. The electrochemical cell of claim 13, wherein at least one of the first and second electrically conductive pathways comprises gold.

16. The electrochemical cell of claim 13, wherein at least one of the first and second electrically conductive pathways comprises a platinum-containing material selected from a substantially pure platinum material and a composite reinforced metal ceramic (CRMC) material, the CRMC material comprising, by weight %, from about 10:90 ceramic:platinum to about 90:10 ceramic:platinum.

17. The electrochemical cell of claim 16, wherein the CRMC material comprises from about 70:30 ceramic:platinum to about 30:70 ceramic:platinum.

18. The electrochemical cell of claim 16, wherein the ceramic in the CRMC material is either 3% YSZ or alumina, and mixtures thereof.

19. The electrochemical cell of claim 13, wherein the electrode assembly is of either a Li/LiCoO$_2$ or a Li/LiNi$_a$Mn$_b$Co$_{1-a-b}$O$_2$ couple.

20. The electrochemical cell of claim 13, wherein the solid electrolyte is Li$_x$PO$_y$N$_z$ with x ranging from 3 to 4, y ranging from 3 to 4, and z ranging from 0.1 to 1.

21. The electrochemical cell of claim 13, wherein the solid electrolyte encases the cathode active material and the current collector.

22. A method for providing an electrochemical cell, comprising the steps of:
   a) providing an open-ended ceramic container having a first via hole and a second via hole extending to a ceramic container inner surface and a spaced apart ceramic container outer surface;
   b) filling a paste of a platinum-containing material into the first and second via holes and then heating the ceramic container to transform the paste into a platinum-containing material hermetically sealed to the ceramic container to thereby provide first and second electrically conductive pathways in the first and second via holes;
   c) depositing a current collector onto the inner surface of the ceramic container so that the current collector is electrically connected to the first electrically conductive pathway in the first via hole;
   d) depositing a first electroactive material onto the current collector opposite the first electrically conductive pathway so that the first electroactive material is electrically connected to the first electrically conductive pathway in the first via hole;
   e) depositing a solid electrolyte onto the first electroactive material;
   f) depositing a second electroactive material onto the solid electrolyte opposite the first electroactive material so that the second electroactive material is electrically connected to the second electrically conductive pathway in the second via hole,
   g) wherein the solid electrolyte contacts the inner surface of the ceramic container between and separating the first and second electroactive materials from direct physical contact with each other; and
   h) securing a metal lid to the container to close the open end there of and thereby provide a casing housing the first and second electroactive materials separated from direct physical contact with each other by the solid electrolyte, and
   i) wherein the first electrically conductive pathway serves as a first terminal, and the second electrically pathway serves as an opposite polarity second terminal, and wherein the first and second terminals are configured for electrical connection to a load.

23. The method of claim 22, including providing the open-ended ceramic container comprising a ceramic base supporting an outwardly extending annular sidewall having an outer annular edge, and hermetically sealing the lid to the outer annular edge by a gold seal to thereby close the ceramic container.

24. The method of claim 22, including depositing the solid electrolyte so that it encases the first electroactive material and the current collector.

25. The method of claim 22, including providing the paste of the platinum-containing material filled into the first and second via holes in the ceramic container comprising a binder, and subjecting the ceramic container to a heating profile that comprises a binder bake-out heating portion, a sinter heating portion, and a cool down portion to thereby transform the paste into the platinum-containing material hermetically sealed to the ceramic container in each of the first and second via holes.

26. The method of claim 22, including providing the first electroactive material being anode a cathode active material and the second electroactive material being an anode active material.

* * * * *

UNITED STATES PATENT AND TRADEMARK OFFICE
CERTIFICATE OF CORRECTION

| | |
|---|---|
| PATENT NO. | : 11,251,480 B2 |
| APPLICATION NO. | : 16/655286 |
| DATED | : February 15, 2022 |
| INVENTOR(S) | : Robert S. Rubino et al. |

It is certified that error appears in the above-identified patent and that said Letters Patent is hereby corrected as shown below:

In the Claims

Column 14, Line 2, (Claim 22, item h)) delete "there of" and insert --thereof--

Column 14, Line 30, (Claim 26, Line 2) after the word "being" delete the word "anode"

Signed and Sealed this
Tenth Day of January, 2023

Katherine Kelly Vidal
*Director of the United States Patent and Trademark Office*